Feb. 24, 1953
G. J. RABUTEAU
2,629,816
DIVERSITY SYSTEM
Filed March 16, 1948
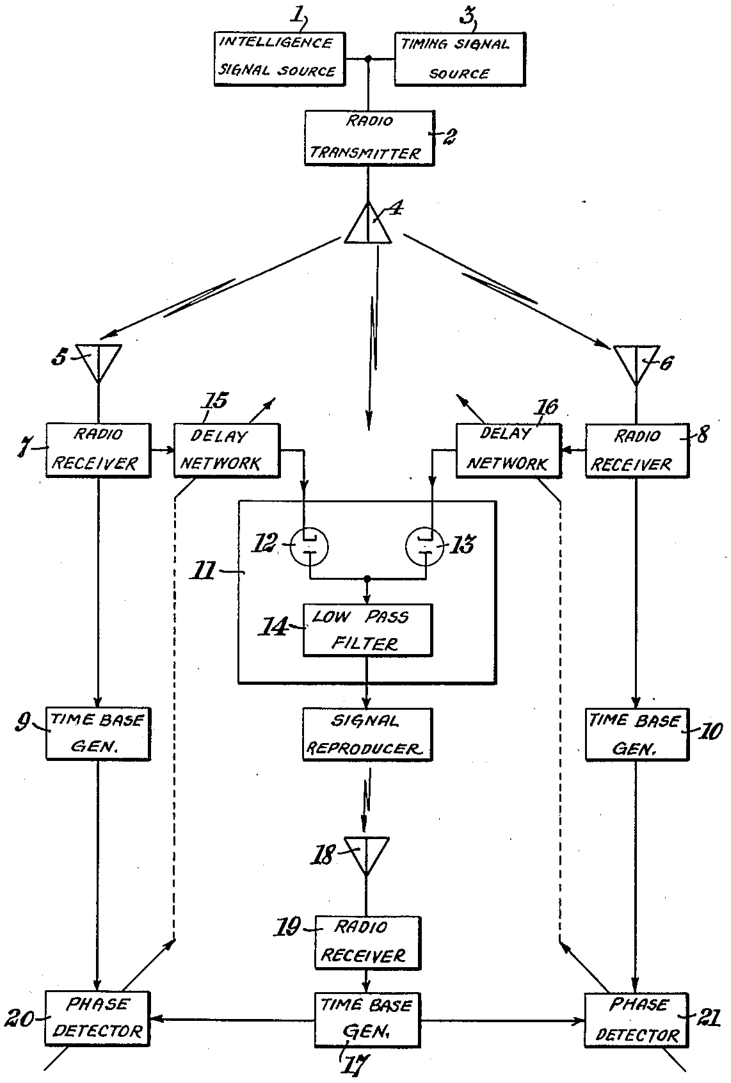
INVENTOR.
GUY J. RABUTEAU
BY
R. P. Morris
ATTORNEY Patented Feb. 24, 1953 2,629,816

UNITED STATES PATENT OFFICE 2,629,816

DIVERSITY SYSTEM

Guy Julien Rabuteau, Paris, France, assignor to International Standard Electric Corporation, New York, N. Y., a corporation of Delaware Application March 16, 1948, Serial No. 15,123

7 Claims. (Cl. 250—6)

This invention relates to radio signalling systems, and more especially it relates to diversity reception employing a plurality of radio receivers which control a common signal reproducer or transducer.

One of the difficulties encountered in long distance radio circuits is that of selective fading, generally regarded as resulting from the interference between those transmitted radio waves which have followed paths of appreciably different effective lengths. Heretofore, this difficulty has been attacked by various forms of diversity reception. For example in space-diversity reception there are used two directionalized radio receiving antennas and respective radio receivers, the antennas being located at spatially separated points. This is done on the basis that signals induced in the several diversity antennas, fade independently, so that there is always a received signal which is not completely faded out. The present invention has for one of its principal objects, improvements in the space-diversity type of radio reception.

Another object of the invention is to provide an arrangement and method for automatically insuring that the signals in several space-diversity receiving channels are brought into like or additive phase, so as to compensate for the undesired phase delay introduced in the transmission.

A feature of the invention relates to an arrangement for space-diversity radio reception, wherein the phases of the signals received in the several diversity receiving channels are compared with a standard timing signal synchronized or locked with a timing component from the transmitter, to produce a resultant signal which is so applied as to bring the signals in the several channels into like phase.

Another feature relates to an arrangement for space-diversity radio reception wherein at the receiving end, each radio receiver produces its own time base signal under control of a timing characteristic in the received signals; while at the same time there is produced at the receivers a standard time reference signal. This reference signal is then compared with the individual time base signals from the several receivers to produce respective phase difference signals which are applied to control respective phase delay means associated with each receiver to bring the signal outputs of the several receivers into like phase.

The above-mentioned and other features and objects of this invention and the manner of attaining them will become more apparent and the invention itself will be best understood, by reference to the following description of an embodiment of the invention taken in conjunction with the accompanying drawing.

In the drawing, there is shown in schematic block diagram form, a preferred embodiment wherein the block 1 represents a suitable signal source, such for example as a telegraph keyer which produces mark and space signals of equal length, such as commonly used to operate teleprinters and the like. These keyed signals are then applied to control any well-known radio transmitter 2. At the same time, the transmitter 2 can be modulated with a standard regularly recurrent timing signal from the timing-synchronizing source 3. Thus, the signal from source 3 may be a pulse having a repetition rate which is very much higher than the signal or keying frequencies from source 1. Consequently, the waves emitted from antenna 4 carry modulations representing the intelligence signals from source 1, and also the standard timing-synchronizing signal from source 3.

The transmitted signals are picked up by two or more diversity receiving antennas 5, 6, which are located at different points spaced apart a distance corresponding to at least five or ten wavelengths of the transmitted frequency. Preferably also, the antennas 5, 6, are directionalized with respect to antenna 4. Associated with each receiving antenna is a respective radio receiver 7, 8, of any well-known type. Each receiver has incorporated therein any well-known demodulation or frequency separation circuits for dividing the intelligence signals and the timing-synchronizing signals into respective paths. Connected to the output of receiver 7 is a time base signal generator 9 of any well-known type, such for example as a saw-tooth wave generator, a multivibrator or the like, which is controlled by the timing-synchronizing signal appearing in the output of receiver 7 to set up a series of time base pulses which are synchronized with the signals from source 3. Likewise, there is connected to the output of receiver 8 a similar time base generator 10, which sets up a separate series of time base signals which are synchronized with the timing pulses applied thereto from the receiver 8.

Because of the selective fading effects in the transmission medium between the antenna 4 and the diversity antennas 5, 6, the time base signal from generator 9 will be displaced in phase with respect to the time base signal from generator 10. Likewise, the intelligence signals in the output of receiver 7 will be out of phase with the corresponding intelligence signals from receiver 8. In order to bring these intelligence signals into the proper additive phase, each receiver is connected to a signal combiner 11, comprising for example respective rectifiers 12, 13, and a low-pass filter 14, this combiner being connected to the respective receivers through respective wave delay networks or devices 15, 16. Associated with the receivers 7 and 8 is a local time base generator 17, which produces standard recurrent timing pulses which are synchronized with the timing pulses from source 3. This synchronization of generator 17 can be effected in any well-known manner. Thus, if necessary, the device 17 can be connected to special pick-up antenna 18 with its associated radio receiver 19 to reproduce the timing-synchronizing pulses generated by source 3. These pulses in the output of receiver 19 can be applied to the device 17 which may take the form of a saw-tooth wave generator, a multi-vibrator or the like. On the other hand, if desired, the generator 17 may be locally controlled so as to produce recurrent standard timing impulses whose frequency and phase with respect to the signals from source 3 can be definitely ascertained. For example, device 17 may consist of a highly stabilized relaxation oscillator or multi-vibrator. Alternatively, generator 17 may be a multi-vibrator whose frequency is controlled by the timing signal from either or both of the receivers 7, 8. In certain well-known kinds of radio transmission, for example so-called pulse time modulation, the signals transmitted from antenna 4 will have an inherent and regularly recurrent timing pulse, and this pulse can be segregated from the output of the receivers 7 and 8 and applied to control the generator 17. Likewise, if the transmission is effected from the antenna 4 by time division multiplex, the repetitive rate component of the multiplex transmission can be used to control the generator 17. Likewise, if the transmission from antenna 4 is in the form of coded transmissions of the scrambled code type where the scrambling code is changed at regular intervals, this recurrent interval change can be used to control the generator 17. The time base signals from generator 9 are compared with the time base signals from the generator 17 in any well-known phase detector 20. Likewise, the time base signals from device 10 are compared with the time base signals from generator 17 in a similar phase detector 21. Thus, the detector 20 may consist of a dynamometer instrument having a pair of dynamometer coils one of which is energized by the signals from the device 9 and the other of which is energized by the signals from generator 17 so as to produce a resultant signal $I_9 I_{17} \cos\theta$, where $I_9$ and $I_{17}$ are the currents in the two coils of the dynamometer and $\theta$ is the phase difference between these currents. The phase detector 21 may consist of a similar pair of dynamometer coils each respectively energized by the devices 10 and 17. It will be understood of course that any other well-known type of phase difference detection device may be employed.

The output signal from the detector 20 can then be applied in any well-known manner to control an adjustable element of the phase delay network 15. Likewise, the output of detector 21 can be applied to control an adjustable element of the delay network 16. Thus the delays introduced by the networks 15 and 16 are automatically adjusted so as to equalize for the receiver 7 the difference in time which exists between the time base signal from generator 17 and the time base signal from device 10. Likewise, for receiver 8 the adjustment is made to equalize the difference in time which exists between the time reference signal from generator 17 and the time base signal from device 9. By suitable adjustment of the parts, the difference in timing which exists between the intelligence signals from receivers 7 and 8 can then be automatically and continuously compensated by the time delays introduced in the networks 15 and 16. It is thus possible to parallel the two retimed signals without introducing the usual timing distortions.

While the drawing shows a diversity receiving system employing two diversity receiving channels, it will be understood that a greater number of channels may be employed, each channel having a radio receiver with a time base generator corresponding to generator 9, the output of which is compared with the signal from generator 17 in a phase detector similar to detector 20. Each additional receiver is also provided with a delay network corresponding to network 15, so as to bring the signals in all the channels into the same additive phase.

While the proper phasing or retiming of the signals from the several diversity receiving channels is effected by the automatically-controlled delay networks 15 and 16, it will be understood that any other equivalent manner of producing the relative delays may be employed.

While I have described above the principles of my invention in connection with specific apparatus, it is to be clearly understood that this description is made only by way of example and not as a limitation to the scope of my invention.

What is claimed is:

1. An arrangement for radio reception by space diversity, comprising a plurality of separate radio receivers spatially separated for diversity reception of the same transmission which includes a regularly recurrent timing component, a time base signal generator connected to one radio receiver to produce a first time base signal controlled by the timing component appearing in the output of said one receiver, another time base signal generator connected to another radio receiver to produce a second time base signal controlled by the timing component appearing in the output of said other radio receiver, means local to said receivers to produce a standard timing signal of the same frequency as said component, means to produce control voltages corresponding to the phase difference between said standard timing signal and said time base signals, and means responsive to said control voltages to bring the intelligence signals in all the channels into time synchronism with each other.

2. An arrangement according to claim 1 in which means are provided for electrically locking said standard timing signal with said timing component.

3. An arrangement according to claim 1 in which said means responsive to said control voltage comprises wave delay means coupled to the outputs of said receivers, and additional means for automatically and continuously adjusting said delay means in response to said control voltages to bring said intelligence signals from the receivers into time synchronism.

4. A radio signalling system comprising a plurality of space-diversity receiving channels for receiving the same transmission which includes a regularly recurrent timing pulse, each of said channels including a separate receiving antenna and respective radio receiver, a first time base signal generator controlled by the timing pulse appearing in the output of one radio receiver, a second time base signal generator controlled by the timing pulse appearing in the output of another radio receiver, means local to said receivers to produce a standard timing signal of the same frequency as said timing pulse, means to produce a first control voltage corresponding to the phase difference between said standard timing signal and one of said time base signals, means to produce a second control voltage corresponding to the phase difference between said standard timing signal and the other time base signal, an adjustable time delay device connected to the intelligence signal output of each radio receiver, and means to apply said control voltages to automatically adjust said delay devices to bring the intelligence signals into time synchronism with each other, and a common signal combining arrangement upon which the synchronized intelligence signals are simultaneously impressed.

5. A radio signalling system comprising means to transmit intelligence signals accompanied by a regularly recurrent timing component, a pair of space diversity radio receiving channels for said signals, means local to said channels to produce a standard timing signal of the same frequency as said timing component, means to compare the timing component as received in each channel with said standard timing signal to derive control voltages, and delay means controlled by said control voltages to bring the intelligence signals from both channels into time synchronism with each other.

6. A radio signalling system according to claim 5 in which said comparing means includes a phase detector for producing a control voltage which represents the phase difference between the timing component as received in one of said channels and the said standard timing signal.

7. A radio signalling system comprising means to transmit intelligence signals accompanied by regularly recurrent timing pulses, a first receiving antenna, a second receiving antenna, said antennas being spatially separated for space diversity reception, a radio receiver connected to said first antenna, another radio receiver connected to said second antenna, a first time base signal producer controlled by the pulses received by the first receiver, a second time base signal producer controlled by the pulses received by said second receiver, a source of standard timing signals of the same frequency as said timing component, a phase detector for comparing the phase of the first time base signal with said standard timing signals, another phase detector for comparing the phase of the second time base signal with said standard timing signals, each phase detector producing a control voltage representing the phase difference between the time base signal and the standard timing signals applied thereto, a signal delay device connected to the output of the first receiver, another signal delay device connected to the output of the second receiver, means to automatically adjust each signal delay device by a respective one of said control voltages to bring the intelligence signals from both receivers into time synchronism with each other, and a common signal combining network upon which the said time synchronized signals are simultaneously impressed.

GUY JULIEN RABUTEAU.

REFERENCES CITED

The following references are of record in the file of this patent:

UNITED STATES PATENTS

| Number | Name | Date |
|---|---|---|
| 2,089,409 | Ohl | Aug. 10, 1937 |
| 2,268,844 | Polkinghorn | Jan. 6, 1942 |
| 2,375,126 | Mathes | May 1, 1945 |
| 2,403,626 | Wolff et al. | July 9, 1946 |
| 2,408,773 | Goodall | Oct. 8, 1946 |
| 2,419,523 | Alford | Apr. 29, 1947 |
| 2,448,866 | Crosby | Sept. 7, 1948 |
| 2,505,266 | Villem | Apr. 26, 1950 |